United States Patent
Hagle et al.

(10) Patent No.: US 6,592,287 B1
(45) Date of Patent: Jul. 15, 2003

(54) SELF-FIXTURED JOINT ASSEMBLY AND ITS PREPARATION

(75) Inventors: Michael P. Hagle, Mason, OH (US); Gilbert Farmer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/399,016

(22) Filed: Sep. 21, 1999

(51) Int. Cl.⁷ .................................................. F16L 13/02
(52) U.S. Cl. ........................ 403/277; 403/375; 403/383; 228/258
(58) Field of Search ................................ 403/270, 271, 403/272, 375, 383, 359.6; 228/258, 165, 204

(56) References Cited

U.S. PATENT DOCUMENTS

| | | | | |
|---|---|---|---|---|
| 4,642,864 A | * | 2/1987 | Metcalfe et al. ..... 228/124.6 X |
| 4,652,209 A | * | 3/1987 | Buddenbohm ........... 415/174.4 |
| 4,830,390 A | * | 5/1989 | Yamaki et al. ............... 280/280 |
| 5,026,611 A | * | 6/1991 | Ussi et al. ............... 228/258 X |
| 5,173,471 A | * | 12/1992 | Usui et al. .................... 502/439 |
| 5,215,335 A | * | 6/1993 | Hamm, Jr. .................... 285/39 |
| 5,272,930 A | * | 12/1993 | Nakamura et al. ............. 74/434 |
| 5,348,210 A | * | 9/1994 | Linzell ........................ 228/115 |
| 5,507,528 A | * | 4/1996 | Mastrosimone ............... 285/22 |

* cited by examiner

Primary Examiner—Lynne H. Browne
Assistant Examiner—John Cottingham
(74) Attorney, Agent, or Firm—Nathan D. Herkamp; Gregory O. Garmong

(57) ABSTRACT

An assembly of parts is prepared by providing a female part having a recess and a male part having an inserted surface received within the recess. A relief pattern such as knurling is formed on the inserted surface. The inserted surface of the male part is inserted into the recess of the female part with a contacting-channeled fit between the inserted surface and the recess surface, so that the knurl serves to align the inserted surface within the recess. The inserted surface of the male part is brazed or otherwise joined to the recess of the female part.

20 Claims, 4 Drawing Sheets

SELF-FIXTURED JOINT ASSEMBLY AND ITS PREPARATION

FIELD OF THE INVENTION

This invention relates to the joining of articles together and, more particularly, to the alignment of articles that are to be joined.

BACKGROUND OF THE INVENTION

In one type of manufacturing process, two articles are prepared separately, fitted together in a male/female joint, and brazed. The procedure may be extended to the assembly and brazing of multiple parts to each other, either simultaneously or sequentially. An example of interest to the inventors is the sequential assembly and brazing of a combustor dome assembly of an aircraft gas turbine engine. Multiple swirler/spectacle plate/deflector assemblies are brazed together, and then the multiple swirler/spectacle plate/deflector assemblies are brazed to the combustor dome.

In each case, a male inserted surface is dimensioned to be received into a female recess, with a sufficient clearance to provide for a subsequent brazed joint. A combination of fixturing and tack welding is used to hold the male part in a specific required relation to the female part. The assembly of parts and fixturing is heated in an oven to a temperature above the melting point of the braze metal The braze metal is drawn up into the clearance space between the male inserted surface and the female recess by capillary action. When the assembly is cooled, the braze metal solidifies to join the parts together. The fixturing is thereafter removed.

While operable and widely used, this approach has the drawback that complex fixturing may be required, which is time consuming to fabricate, install, and remove. In the case described above, there are multiple swirlers and deflectors to be assembled, each requiring careful assembly and alignment of the fixturing. If the fixturing should be installed with a slight misalignment of the parts, or if the fixturing shifts during the heating of the parts in the furnace during the brazing cycle, the final result is misalignment of the brazed parts and necessary rework if alignment tolerances are exceeded. Tack welds may also be used between the parts to be brazed and/or between the fixturing and the parts, which involves the initial welding cost. Additionally, it is often the case that even careful fixturing alignment leaves a nonuniform clearance around the circumference of the male inserted surface, so that the completed braze joint is slightly nonuniform. The clearance between the parts must be sufficient to ensure that the braze metal can flow into the clearance gap, which may result in even further misalignments of the parts and nonuniformity of the braze joint.

There is a need for an improved approach to the manufacturing of braze assemblies and other joined assemblies, where the joining material lies between the parts to be joined. The present invention fulfills this need, and further provides related advantages.

SUMMARY OF THE INVENTION

The present invention provides an assembly of parts that are joined together by a joining material that is disposed between the parts, and a method for preparing the assembly of parts. The approach of the invention does not require fixturing or tack welding, or a change in the configuration of the parts, yet holds the parts carefully and precisely in the desired orientation. The clearance between the male inserted surface and the female recess may be made uniform prior to joining, resulting in a uniformly thick joint. The approach of the invention may be used with a wide variety of types of parts to be joined, and in both simultaneous and sequential joining of assemblies with more than two parts.

An assembly of parts comprises a female part having a recess therein with a recess surface, and a male part having an inserted surface received within the recess of the female part. There is a relief pattern on at least one of the recess surface and the inserted surface. The recess surface, the inserted surface, and the relief pattern are dimensioned such that the inserted surface is received within the recess with a contacting-channeled fit between the inserted surface and the recess surface. A joining material joins the inserted surface to the recess surface, with the joining material disposed within a relief volume of the relief pattern. The joining material preferably comprises a quantity of joining metal such as braze metal disposed within the relief volume.

Preferably, the relief pattern is on the inserted surface. The relief pattern has a relief dimension (i.e., relief depth) of not less than about 0.001 inch, preferably from about 0.001 to about 0.010 inches, and most preferably from about 0.001 to about 0.007 inch. The recess surface is substantially cylindrical. The relief pattern preferably comprises a knurl pattern, such as a diamond knurl pattern or a straight knurl pattern. Desirably, the male part and the female part are components of a gas turbine engine.

A method for preparing an assembly of parts comprises the steps of providing a female part having a recess therein, the recess having a recess surface, and providing a male part having an inserted surface receivable within the recess of the female part. A relief pattern is formed on at least one of the recess surface and the inserted surface, preferably extending substantially around the entire lateral periphery of the surface. The recess surface, the inserted surface, and the relief pattern are dimensioned such that the inserted surface is received within the recess with a contacting-channeled fit between the inserted surface and the recess surface. The inserted surface of the male part is inserted into the recess of the female part, and the inserted surface of the male part is joined to the recess surface of the female part with a joining material disposed within a relief volume of the relief pattern.

The relief pattern, preferably in the form of knurling, in conjunction with the contacting-channeled fit between the parts, provides a self-fixturing that holds the two parts in exactly the proper position for joining. By extending the relief pattern around substantially the entire lateral periphery of the surface, the relief pattern centers the inserted surface within the recess. No separate fixturing or tack welding is required. The joining material fills the relief volume defined by the relief pattern, so that the joining material has a uniform thickness around the circumference of the joint. For brazing, the braze clearance gap may be made smaller than with conventional approaches in those situations where appropriate, improving capillary flow and strength of the joint. The size of the braze clearance gap between the parts may be established precisely yet inexpensively, at any value over a range of values.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
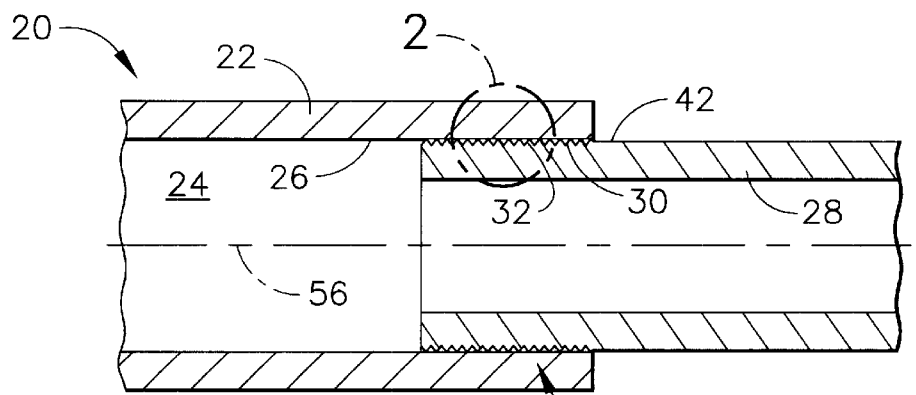
FIG. 1 is a schematic cross sectional view of two parts joined together with the approach of the invention.
Figure 2:
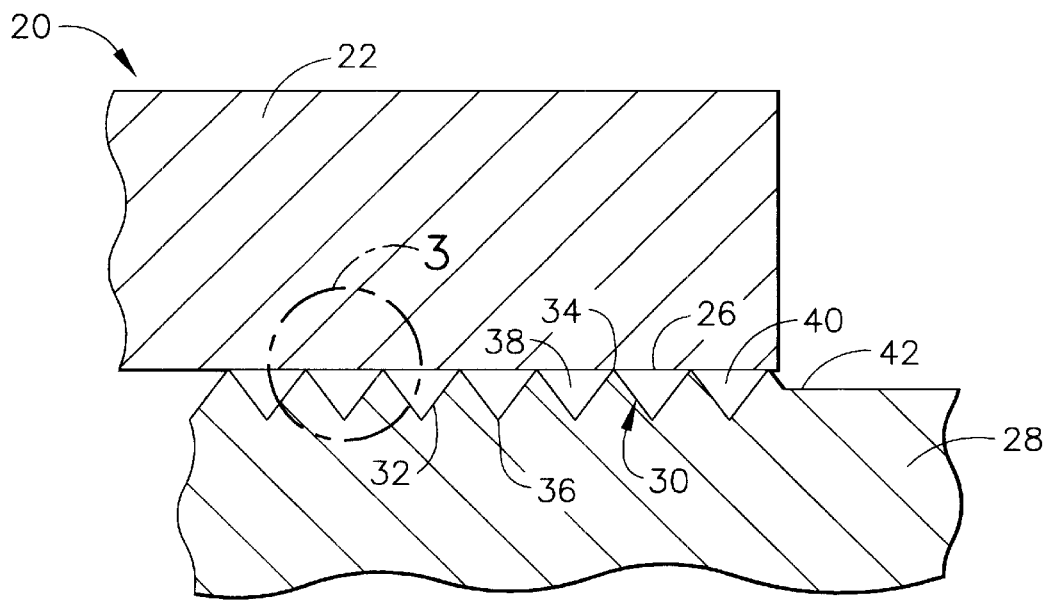
FIG. 2 is an enlarged detail of the two parts of FIG. 1, taken in region 2—2.
Figure 3:
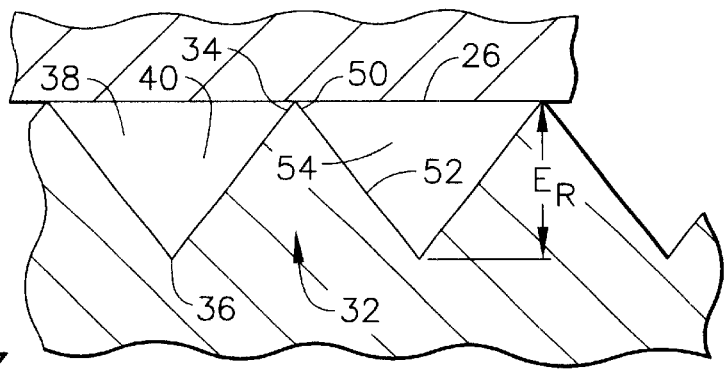
FIG. 3 is an enlarged sectional view of a relief pattern of FIG. 2, taken in region 3—3.

FIGS. 1–3 illustrate an assembly of parts 20 in increasing enlargements. As illustrated in FIG. 1, the assembly of parts 20 includes a female part 22 having a recess 24 therein. The recess 24 has a recess surface 26. The assembly of parts 20 further includes a male part 28 having an inserted surface 30 received within the recess 24 of the female part 22. The male part 28 is joined to the female part 22 at a joint 31. Preferably, the recess surface 26 and the inserted surface 30 are both substantially cylindrical (except for the relief pattern discussed subsequently) with a cylindrical axis 56, although other conforming and compatible shapes may be used. The parts 22 and 28 are illustrated in a general form, and the invention is applicable to a wide variety of such assembled parts. A specific case of interest to the inventors will be discussed subsequently.

A relief pattern 32 is formed on at least one of the recess surface 26 and the inserted surface 30. As used herein, a "relief pattern" is a pattern in the surface in which there is a controlled variation in height of different parts of the pattern relative to each other. The relief pattern 32 is preferably formed on the inserted surface 30 of the male part 28, as generally it is easier to form the relief pattern 32 on the male inserted surface 30 than on the recess surface 26.

Figure 9:
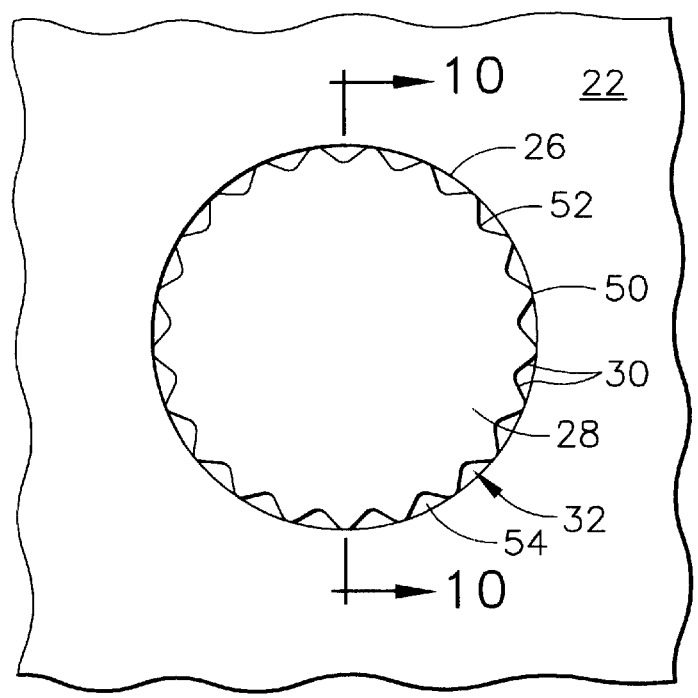
FIG. 9 is an end elevational view of two parts that fit together with a contacting-channel fit.
Figure 10:
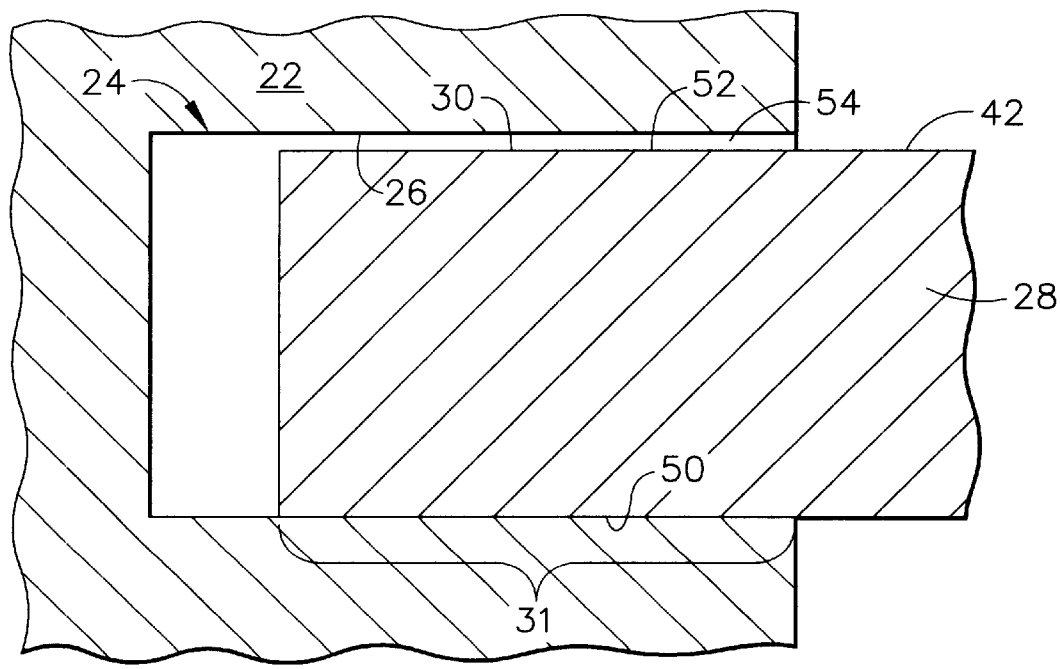
FIG. 10 is a schematic sectional view through the structure of FIG. 9, taken on line 10—10.

The recess 24, the recess surface 26, the inserted surface 30, and the relief pattern 32 are dimensioned such that the inserted surface 30 is received within the recess 24 with a contacting-channeled fit between the inserted surface 30 and the recess surface 26. As used herein, a "contacting-channeled fit" is a relationship and fit between the two surfaces in which a first portion of the inserted surface contacts the recess surface, and a second portion of the inserted surface is separated from the recess surface in the form of lengthwise channels whose surfaces are spaced apart from the recess surface and which extend through the joint, and wherein the channels are in fluid communication with an external surface of the male part. This type of contacting-channeled fit is illustrated in FIGS. 9 and 10. A first portion 50 of the inserted surface 30 of the male part 28 contacts the substantially cylindrical recess surface 26 of the female part 22, typically with a frictional contact. A second portion 52 of the inserted surface 30 of the male part 28 is spaced apart from the recess surface 26 to define channels 54 that communicate with the external surface 42 of the male part 28. In FIGS. 9 and 10, the clearance between the second portion 52 and the recess surface 26 is exaggerated so as to be visible. This clearance may be made smaller than is the case for conventional brazed parts, as will be discussed in greater detail subsequently. Also as seen in FIG. 9, the relief pattern 32 desirably extends substantially around the entire lateral periphery (circumference in this cylindrical case) of the male part 28, although there may be some regions having no second portions 52. As seen in FIG. 10, the second portion 52 extends through the joint 31.

In this structure including the contacting-channeled fit, the first portion 50 holds the female part 22 and the male part 28 in a fixed relationship upon assembly and prior to the application of a joining material. The second portion 52 provides channels to allow the subsequent penetration of the joining material from the external surface 42 into the region of the joint 31. The contacting-channeled fit between the inserted surface 30 and the recess surface 26 is achieved as the male part 28 is inserted into the recess 24. The contacting-channeled fit holds the male part 28 in a desired fixed relationship to the female part 22 during the joining of the two parts 28 and 22, when the joining material flows through the channels. Consequently, there is no separate fixturing or temporary welding required between the two parts 28 and 22.

FIG. 2 illustrates a preferred form of the relief pattern 32 in more detail, and FIG. 3 illustrates the relief pattern in even greater detail. The relief pattern 32 includes peaks 34 and valleys 36 formed in the base material of the male part 28. In FIGS. 2–3, the relief pattern 32 is illustrated as being a regular sawtooth pattern in form, because a regular form is produced by the preferred knurling technique for forming the relief pattern 32. However, the relief pattern 32 need not be highly regular, and may be somewhat irregular as illustrated in FIG. 9. In FIGS. 2–3, the peaks 34 are illustrated as being sharp at their summits, but they may be flattened somewhat as the peaks 34 are deformed when the male part 28 is inserted into the recess 24 of the female part 22. The relief pattern 32 may be described as having a relief dimension $E_R$ (i.e., a relief depth) measured between the tops of the peaks 34 and the bottoms of the valleys 36. The relief dimension $E_R$ has a value of not less than about 0.001 inch, and preferably not less than about 0.0015 inch for the preferred brazing approach. (The term "not less than" means that the relief dimension $E_R$ is about 0.001 inch or exceeds about 0.001 inch.) The relief dimension $E_R$ preferably does not exceed about 0.010 inch, and most preferably does not exceed about 0.007 inch for the preferred brazing approach There is a relief volume 38 in the open space between the peaks 34, which is also the volume bounded by the second portion 52 of the inserted surface 30 and the recess surface 26. If the relief dimension $E_R$ is less than about 0.001 inch or exceeds about 0.010 inch, the brazing material will not readily flow through the relief volume 38. Even better flow is achieved if the relief dimension does not exceed about 0.007 inch. The relief dimension $E_R$ may be different for other types of joining materials than braze alloy.

A joining material 40 joins the inserted surface 30 to the recess surface 26, thereby joining the male part 28 to the female part 22. The joining material 34 is disposed within the relief volume 38 of the relief pattern 32. The joining material 34 adheres to the sides of the peaks 34 and to the recess surface 26 to accomplish this joining.

The joining material 40 may be any operable material. The joining material 40 is desirably a joining metal which melts at a temperature less than the parts to be joined. Such a joining metal may be a braze metal having a melting point of about 800° F. or more, or a solder metal having a melting point of less than about 800° F. (This distinction between a braze metal and a solder metal in terms of the melting point of the metal, a definition convention widely used in the art, is adopted here.) Preferably, the joining material 40 is a braze alloy that melts at a lower temperature than the materials of construction of the parts 22 and 28. Braze alloys are known in the art for various types of materials of the parts 22 and 28, although not previously for the present approach. For example, if the parts 22 and 28 are superalloys such as Mar-M-509 having a nominal composition of about 52 weight percent cobalt, 23 weight percent chromium, 10 weight percent nickel, 7 weight percent tungsten, 3.5 weight percent tantalum, balance nickel and impurities, or L605, having a nominal composition of about 52 weight percent cobalt, 20 weight percent chromium, 10 weight percent nickel, 15 weight percent tungsten, balance nickel and impurities, the braze metal that serves as the joining material 40 is preferably AMS 4779, having a nominal composition of 94 weight percent nickel, 3.5 weight percent silicon, 1.8 weight percent boron, balance impurities. Other joining materials such as flowable nonmetallic adhesives and welding materials may instead be used.

The relief pattern 32 and the channels 54 defined by the second portion 52 of the inserted surface 30 provide a relief volume 38 that is continuous with the external surface 42 of the male part 28, so that during the joining operation (discussed subsequently) the molten braze material may flow from the external surface 42 into the relief volume 38 along the channels 54 and thence through the region that becomes the joint 31. Upon subsequent cooling and solidification of the braze metal, the braze metal adheres to the sides of the peaks 34 (i.e., the second portion 52) and to the recess surface 26 to accomplish the joining of the parts 22 and 28. The relief pattern 32 is preferably formed around substantially the entire lateral periphery (circumference, in the case of a cylindrical male part 28) of the inserted surface 30, to define a uniform clearance that is filled with the joining material 40 in order to achieve a uniform final joint thickness.

Figure 4:
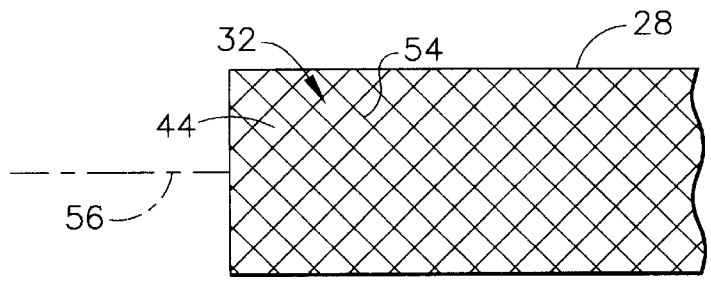
FIG. 4 is an elevational view of a diamond knurl pattern on a male inserted surface.
Figure 5:
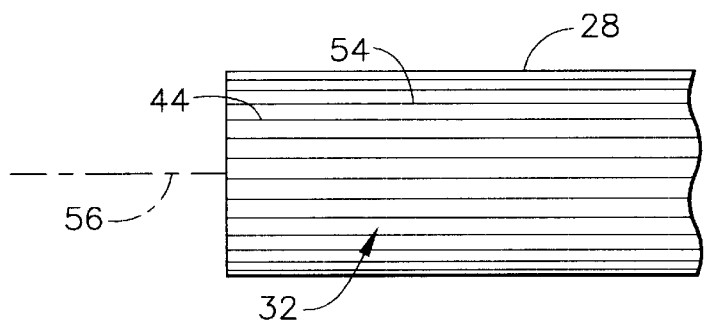
FIG. 5 is an elevational view of a straight knurl pattern on a male inserted surface.

It is desirable that the relief pattern 32 be formed in a controlled manner to relatively good dimensional tolerances in order to achieve the contacting-channeled fit. It is also desirable that the relief pattern be formed relatively inexpensively, if possible. These criteria are satisfied by forming the relief pattern as a knurl on the inserted surface 30. FIGS. 4 and 5 illustrate a diamond knurl pattern 44 and a straight knurl pattern 46, respectively. The channels 54 of the diamond knurl pattern 44 do not extend parallel to the cylindrical axis 56, but have a component parallel to the axis 56 and an intersecting pattern of channels 54 that permit the braze material to flow longitudinally through the joint 31. Knurl patterns are easily applied to a male inserted surface 30 prior to insertion using a conventional knurling tool attached to a lathe. The relief pattern 32 may instead be formed by any other operable technique, such as casting or molding the surface with the relief pattern therein, rolling the relief pattern into the surface, or machining the relief pattern into the surface. The relief pattern 32 may instead be formed into the recess surface 26 if that is convenient, but generally that is more difficult and expensive than forming the relief pattern 32 into the inserted surface 30. The knurl pattern has the relief dimension as defined earlier.

Figure 6:
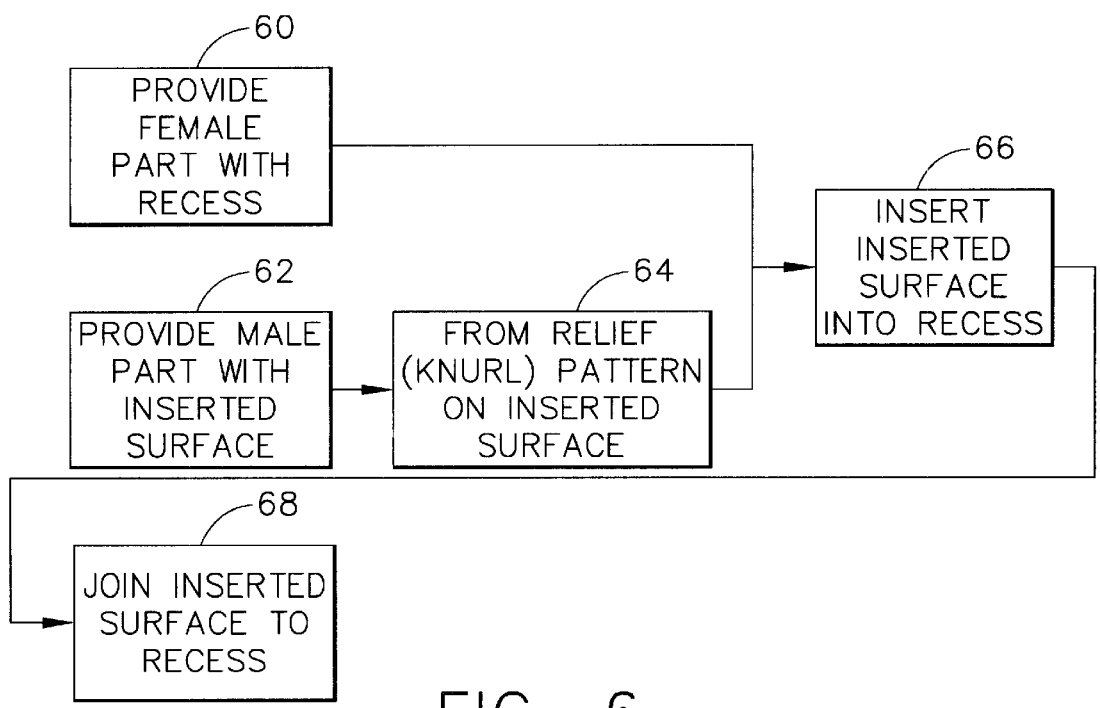
FIG. 6 is a block flow diagram of an approach for preparing an assembly of parts.

FIG. 6 illustrates a preferred method for preparing the assembly of parts 20. The female part 22, with the recess 24 and recess surface 26, is provided, numeral 60, by any operable approach. Typically, the female part 22 is machined or cast to shape. The recess 24 is formed in the female part 22 either in the initial forming operation, or subsequently machined or otherwise introduced into female part 22. The male part 28 with the inserted surface 30 is provided, numeral 62, by any operable approach. Typically, the male part 28 is machined or cast to shape. The relief pattern 32 is formed on at least one of the recess surface 26 or the inserted surface 30, numeral 64, by any operable approach. In the preferred case, the relief pattern 32 is a knurl pattern such as shown in FIGS. 4 and 5.

The inserted surface 30 is inserted into the recess 24, with the contacting-channeled fit between the inserted surface 30 and the recess surface 26, numeral 66. The insertion 66 is accomplished by any operable approach. The inserted surface 30, and in particular the first (contacting) portion 50, may be dimensioned to permit either a slip-fit insertion or an interference-fit insertion into the recess surface 26. An interference-fit insertion may be accomplished by a force fit, or other known techniques such as cooling the male part 28 to contract it prior to insertion, or heating the female part 22 to expand it prior to insertion, or both. The male part 28 and/or the female part 22 may deform during the insertion, as long as the relief pattern 32 and channels 54 are retained after the insertion is complete.

The inserted surface 30 of the male part 28 is joined to the recess surface 26 by any operable approach, numeral 68, preferably by brazing. In brazing, a solid piece of braze metal is placed onto the external surface 42 of the male part 28. The female part 22, the male part 28, and the solid piece of braze alloy are heated to a temperature greater than the melting point of the braze alloy. The braze alloy melts, and flows into the relief volume 38 by capillary action. The female part 22, male part 28, and reflowed braze alloy are thereafter cooled to a temperature below the melting point of the braze alloy. The braze metal solidifies, joining the female part 22 and the male part 28 to form the joint 31. The joining step 68 may be modified as necessary according to the type of joining practiced. For example, if the joining material is a solder, lower temperatures are used. If the joining material is a nonmetallic adhesive, the flowing of the adhesive from the external surface 42 into the channels 54 of the relief pattern 32 may be accomplished by applying pressure to the adhesive that is on the external surface 42, forcing it into the channels 54 of the relief pattern 32.

Figure 7:
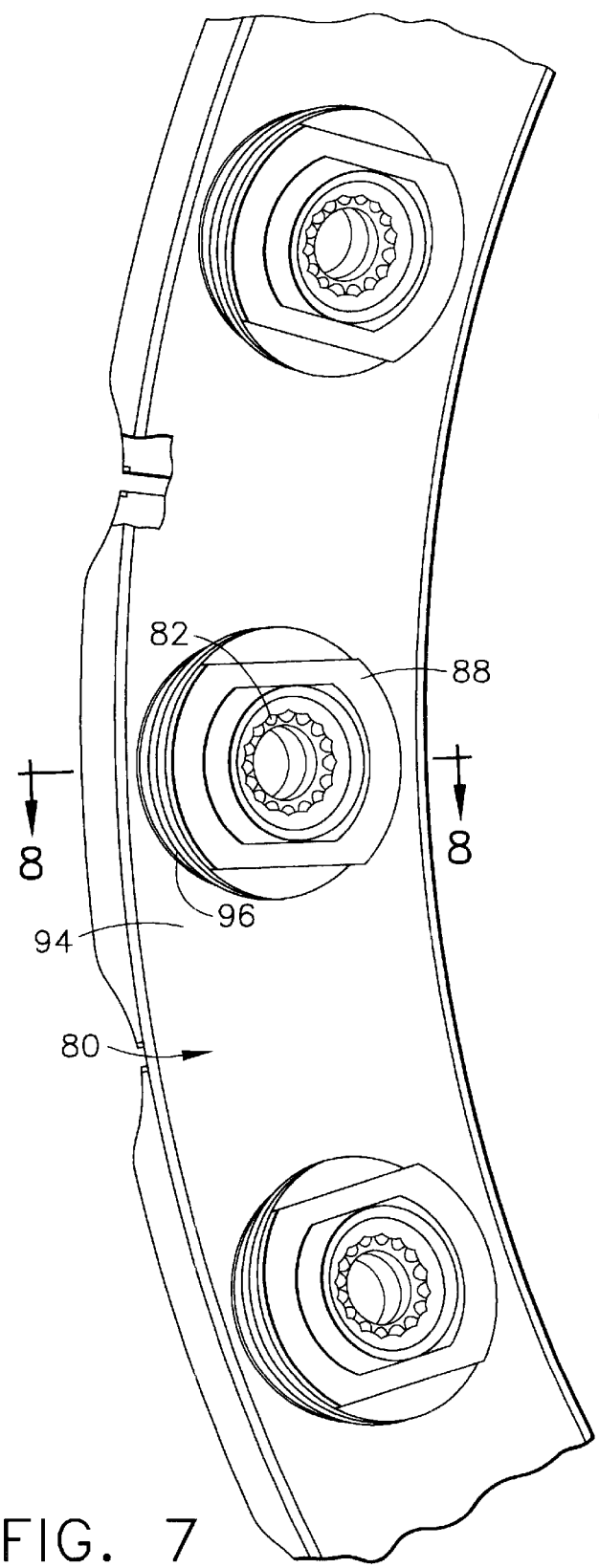
FIG. 7 is a perspective view of a combustor dome assembly of a gas turbine engine.
Figure 8:
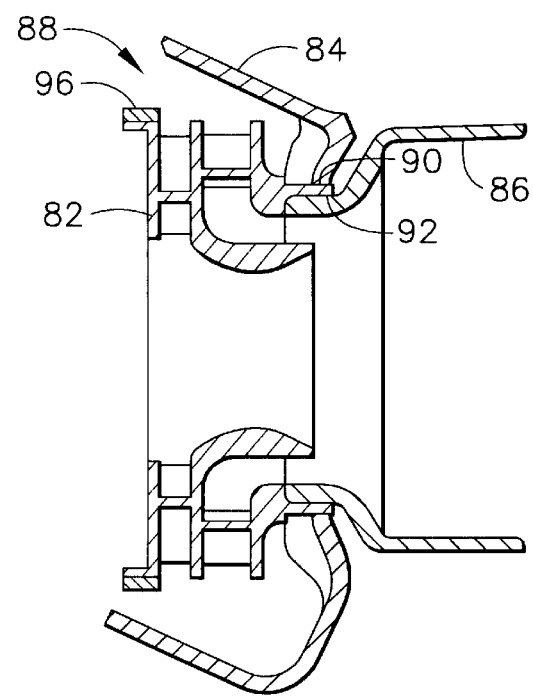
FIG. 8 is an enlarged schematic sectional view illustrating a detail of the combustor dome assembly of FIG. 7, taken along line 8—8.

FIGS. 7 and 8 illustrate an application of interest to the inventors, in which the present approach is used to form an assembly of parts that constitutes a gas turbine combustor dome assembly 80. A portion of the combustor dome assembly 80 is shown in FIG. 7. The combustor dome assembly 80 includes a swirler 82, a spectacle plate 84, and a deflector 86. The structure and operation of combustor dome assemblies are known in the art, except for the present approach for forming the assembly of parts. This assembly of parts includes a subassembly 88 including a first brazed joint 90 between the swirler 82 and the spectacle plate 84, and a second brazed joint 92 between the spectacle plate 84 and the deflector 86. The subassembly 88 is thereafter brazed to an aperture in a combustor dome 94 with a third brazed joint 96, to form the combustor dome assembly 80. Each of the first brazed joint 90, the second brazed joint 92, and the third brazed joint 96 are formed using the self-fixturing approach described herein. That is, although the discussion of FIGS. 1–6 had focused on an assembly where there was a single brazed joint, the present approach is applicable to assemblies where there are multiple brazed joints that are formed either simultaneously or sequentially. In a typical gas turbine, there are 20 of the subassemblies 88, and the present approach offers a substantial savings of time and money in forming the combustor dome assembly 80.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An assembly of parts, comprising:
   a female part having a recess therein, the recess having a recess surface;
   a male part having an inserted surface received within the recess of the female part;
   a relief pattern on the inserted surface, wherein the recess surface, the inserted surface, and the relief pattern are dimensioned such that the inserted surface is received within the recess with a contacting-channeled fit between the inserted surface and the recess surface, wherein the relief pattern has a relief dimension of from about 0.001 inch to about 0.010 inch and wherein the relief pattern forms channels extending from an external surface of the male part to the inserted surface; and
   a joining material that joins the inserted surface to the recess surface, the joining material being disposed within a relief volume of the relief pattern.

2. The assembly of parts of claim 1, wherein the joining material comprises a quantity of a joining metal disposed within the relief volume.

3. The assembly of parts of claim 1, wherein the joining material comprises a quantity of braze metal disposed within the relief volume.

4. The assembly of parts of claim 1, wherein the relief pattern has a relief dimension that does not exceed about 0.007 inch.

5. The assembly of parts of claim 1, wherein the relief pattern has a relief dimension of from about 0.001 inch to about 0.007 inch.

6. The assembly of parts of claim 1, wherein the recess surface is substantially cylindrical.

7. The assembly of parts of claim 1, wherein the relief pattern comprises a knurl pattern.

8. The assembly of parts of claim 1, wherein the male part and the female part are components of a gas turbine engine.

9. An assembly of parts, comprising:
   a female part having a recess therein, the recess having a cylindrical recess surface;
   a male part having a cylindrical inserted surface received within the recess of the female part;
   a relief pattern on the inserted surface, wherein the cylindrical recess surface, the cylindrical inserted surface, and the relief pattern are dimensioned such that the cylindrical inserted surface is received within the recess with a contacting-channeled fit between the cylindrical inserted surface and the cylindrical recess surface, wherein the relief pattern has a relief dimension of from about 0.001 inch to about 0.010 inch; and
   a quantity of braze metal disposed between the cylindrical inserted surface and the recess, and disposed within a relief volume of the relief pattern.

10. The assembly of parts of claim 9, wherein the knurl pattern has a relief dimension that does not exceed about 0.007 inch.

11. The assembly of parts of claim 9, wherein the knurl pattern has a relief dimension of from about 0.001 inch to about 0.007 inch.

12. The assembly of parts of claim 9, wherein the male part and the female part are components of a gas turbine engine.

13. A method for preparing an assembly of parts, comprising the steps of:
   providing a female part having a recess therein, the recess having a recess surface;
   providing a male part having an inserted surface receivable within the recess of the female part;
   forming a relief pattern on the inserted surface, wherein the recess surface, the inserted surface, and the relief pattern are dimensioned such that the inserted surface is received within the recess with a contacting-channeled fit between the inserted surface and the recess surface, wherein the relief pattern has a relief dimension of from about 0.001 inch to about 0.010 inch;
   inserting the inserted surface of the male part into the recess of the female part; and
   joining the inserted surface of the male part to the recess surface of the female part with a joining material disposed within a relief volume of the relief pattern.

14. The method of claim 13, wherein the relief pattern has a relief dimension that does not exceed about 0.007 inch.

15. The method of claim 13, wherein the recess surface is substantially cylindrical.

16. The method of claim 13, wherein the relief pattern comprises a knurl pattern.

17. The method of claim 13, wherein the male part and the female part are components of a gas turbine engine.

18. The assembly of parts of claim 1, wherein the recess surface and the inserted surface are each substantially cylindrical.

19. The assembly of parts of claim 9, wherein the relief pattern comprises a knurl pattern.

20. The method of claim 19, wherein the recess surface and the inserted surface are each substantially cylindrical.

* * * * *